US005694900A

United States Patent [19]

Morita et al.

[11] Patent Number: 5,694,900

[45] Date of Patent: Dec. 9, 1997

[54] KNOCK CONTROL SYSTEM FOR AN INTERNAL COMBUSTION ENGINE

[75] Inventors: Shingo Morita; Wataru Fukui, both of Tokyo; Shuichi Wada, Kobe, all of Japan

[73] Assignee: Mitsubishi Denki Kabushiki Kaisha, Tokyo, Japan

[21] Appl. No.: 742,828

[22] Filed: Oct. 31, 1996

[30] Foreign Application Priority Data

Jun. 21, 1996 [JP] Japan .................................... 8-162055

[51] Int. Cl.$^{6}$ ................................ F02P 5/15; G01L 23/22

[52] U.S. Cl. ............................................ 123/425; 73/35.08

[58] Field of Search .................................... 123/425, 435; 73/35.08, 116

[56] References Cited

U.S. PATENT DOCUMENTS

| | | | |
|---|---|---|---|
| 4,444,172 | 4/1984 | Sellmaier et al. | 123/425 |
| 4,491,110 | 1/1985 | Bone et al. | 123/425 |
| 4,539,957 | 9/1985 | Haraguchi et al. | 123/425 |
| 4,601,193 | 7/1986 | Blauhut et al. | 73/35.08 X |
| 5,263,452 | 11/1993 | Ohsawa et al. | 123/425 |

FOREIGN PATENT DOCUMENTS 4-54283 2/1992 Japan .

*Primary Examiner*—Tony M. Argenbright
*Attorney, Agent, or Firm*—Sughrue, Mion, Zinn, Macpeak & Seas, PLLC

[57] ABSTRACT

A knock control system for an internal combustion engine which subjects a knock signal waveform superposed on an ionic current to pulse processing so as to improve a signal-to-noise (SN) ratio, thereby achieving higher reliability thereof without adding to cost. The knock control system for the internal combustion engine is equipped with: a device for deciding the ignition timing for each cylinder based on a crank angle signal; an ignition coil which applies high voltage to spark plugs according to the ignition timing; a device for detecting an ionic current flowing through an ignited spark plug; a device for detecting a knock from an ionic current detection signal; a device for correcting the ignition timing by delaying it when a knock has been detected; a waveform processing device for extracting a knock signal waveform from the ionic current detection signal in the form of a knock pulse string; and a counter for counting the number of pulses from the pulse edges of the knock pulse string. A knock controller decides the amount of delay based on the count value of the pulses.

20 Claims, 7 Drawing Sheets

KNOCK CONTROL SYSTEM FOR AN INTERNAL COMBUSTION ENGINE

BACKGROUND OF THE INVENTION

1. Field of the Invention

The present invention relates to a knock control system for an internal combustion engine which checks for the presence of a knock in accordance with an ionic current detected from a spark plug of an internal combustion engine and, more particularly, to a knock control system for an internal combustion engine which eliminates the influences exerted by noise and the like superposed on the ionic current, thereby improving the reliability thereof.

2. Description of the Related Art

Generally, in a knock control system for an internal combustion engine, the ignition timing is controlled so that it is advanced in order to obtain a maximum output; however, an excessively advanced ignition timing causes a knock immediately after ignition.

An intense knock badly affects the internal combustion engine; therefore, it is necessary to delay the ignition timing in accordance with the occurrence of a knock so as to prevent a severe knock from taking place.

On the other hand, there has been known a controller for advancing the ignition timing at fixed time intervals in order to secure the maximum output. Such a controller is designed to advance the ignition timing by a fixed amount at the fixed time intervals and to delay the ignition timing every time a knock occurs, thereby controlling the ignition timing to the vicinity of the boundary of the occurrence of a knock. Thus, the maximum output may be obtained while restraining knocks.

There has also been known a system for correcting ignition timing to restrain a knock by detecting, as an ionic current, the ion which is generated when a fuel-air mixture burns in the respective cylinders of the internal combustion engine, and by detecting the presence of a knock in accordance with a signal waveform of knock vibrations superposed on the ionic current so as to correct the ignition timing to restrain knocks.

Such a knock control system which makes use of an ionic current enables the detection of the occurrence of a knock and also of the knock intensity in each cylinder; therefore, it is capable of controlling knocks without the need for greatly advancing the ignition timing to provoke a severe knock and then delaying the ignition timing as in a case where a knock sensor is employed.

As it is well known, however, ionic currents are very small currents, posing a problem of noise superposed thereon. It has been extremely difficult to check for the presence of a knock by using an analog knock signal waveform to perform corrective control for restraining knocks. Furthermore, efforts to prevent noise superposition involve shielded wiring which leads to higher cost.

Thus, the conventional knock control systems for internal combustion engines structurally restrain the superposition of noise by providing a transmission path of extremely weak ionic current signals with shielding in order to use ionic current waveforms to secure optimum control. This has been posing a problem of increased cost.

SUMMARY OF THE INVENTION

The present invention has been made with a view toward solving the problems described above and it is an object of the invention to provide a high-accuracy, high-reliability knock control system for an internal combustion engine which is designed to subject a knock signal waveform superposed on an ionic current to pulse processing so as to improve the signal-to-noise (SN) ratio without adding to cost.

To this end, according to a first aspect of the present invention, there is provided a knock control system for an internal combustion engine which is equipped with: a crank angle sensor for generating a crank angle signal in synchronization with the revolution of the internal combustion engine; ignition timing calculating means for determining the ignition timing for each cylinder of the internal combustion engine based on the crank angle signal; an ignition coil for applying a high ignition voltage to a spark plug of each cylinder to be controlled in response to the ignition timing; ionic current detecting means for detecting an ionic current flowing through the spark plug of the cylinder immediately after ignition control to generate an ionic current detection signal; knock detecting means for determining the presence of a knock in the internal combustion engine based on the ionic current detection signal; knock control means for delaying the ignition timing by a predetermined amount when a knock has been detected; wherein the knock detecting means comprises waveform processing means for extracting a knock signal waveform in the form of a knock pulse string from the ionic current detection signal and counting means for counting the number of pulses contained in the knock pulse string based on the respective pulse edges in the knock pulse string; whereby the knock control means determines the delay amount based on the count value of the pulses.

With this arrangement, the SN ratio may be improved by carrying out pulse processing on the knock signal waveform superposed on the ionic current, thus achieving higher reliability without increasing cost.

Further, in the knock control system for the internal combustion engine according to a second aspect of the present invention, the crank angle signals include a series of pulses each corresponding to the respective cylinders, each pulse having the rising edges corresponding to the timing of starting the supply of electric currents to the ignition coil starts during engine cranking and the falling edges corresponding to the initial ignition timing during engine cranking, and the counting means counts the number of pulses during the pulse period from the falling edge to the following rising edge of the crank angle signal.

With this arrangement, the influences of noise at the time of ignition can be removed and the SN ratio can be further improved, resulting in higher reliability.

Further, in the knock control system for the internal combustion engine according to a third aspect of the invention, the knock control means comprises correcting means for correcting at least either the count value of the pulses or the delay amount according to the operation state of the internal combustion engine.

With this arrangement, the reliability can be improved.

In the knock control system for the internal combustion engine according to a fourth aspect of the invention, the correcting means corrects the count value of the pulses by increasing it as the revolution speed of the internal combustion engine increases, and the knock control means determines the amount of delay based on the corrected count value.

In the knock control system for the internal combustion engine according to a fifth aspect of the invention, the correcting means increases the amount of delay as the revolution speed of the internal combustion engine increases.

In the knock control system for the internal combustion engine according to a sixth aspect of the invention, the correcting means corrects the amount of delay based on a two-dimensional map of the revolution speed and charging efficiency of the internal combustion engine.

In the knock control system for the internal combustion engine according to a seventh aspect of the invention, a pair of cylinders are connected to both ends of the secondary winding of the ignition coil, which generates the high voltage for ignition, and are ignition-controlled at the same time, the ionic current of the spark plug of one of the paired cylinders flows via the secondary winding, and the knock control means increases the amount of delay of the ignition timing for one of the paired cylinders.

With this arrangement, the reliability can be improved even when the invention is applied to a simultaneous ignition type internal combustion engine.

In the knock control system for the internal combustion engine according to an eighth aspect of the invention, the knock control means includes filtering means for filtering the count value to calculate a filter value which corresponds to a background and it determines the amount of delay based on the count value obtained by subtracting the filtered value from the present count value.

With this arrangement, the influences by an abrupt change in the number of pulses can be eliminated, leading to higher reliability.

In the knock control system for the internal combustion engine according to a ninth aspect of the invention, the knock control means comprises filtered value limiting means for setting an upper limit value of the filtered value.

In the knock control system for the internal combustion engine according to a tenth aspect of the invention, the filtered value limiting means includes upper value correcting means for correcting the upper limit value based on the operation state of the internal combustion engine.

This arrangement ensures higher reliability regardless of the operation state.

In the knock control system for the internal combustion engine according to an eleventh aspect of the invention, the upper limit correcting means turns the upper limit value of the filtered value into a mapped value based on the revolution speed of the internal combustion engine and increases the upper limit value as the revolution speed increases.

This arrangement enables higher reliability regardless of the revolution speed of an engine.

In the knock control system for the internal combustion engine according to a twelfth aspect of the invention, the filtering means comprises calculating means for setting a filter coefficient $\alpha$ for calculating the filtered value in a range denoted by $0<\alpha<1$ and adding a value, which is obtained by multiplying a previous filtered value by the filter coefficient $\alpha$ and a value, which is obtained by multiplying the present count value of pulses by $(1-\alpha)$, so as to calculate the present filtered value, and filter coefficient correcting means for correcting the filter coefficient $\alpha$ based on the operation state of the internal combustion engine.

This arrangement ensures higher reliability regardless of the operation state.

In the knock control system for the internal combustion engine according to a thirteenth aspect of the invention, the filter coefficient correcting means turns the filter coefficient $\alpha$ into a mapped value based on the revolution speed of the internal combustion engine and it increases the filter coefficient as the revolution speed increases.

This arrangement enables higher reliability regardless of the revolution speed of an engine.

In the knock control system for the internal combustion engine according to a fourteenth aspect of the invention, the filtering means calculates a filtered value at a timing which corresponds to a pulse edge of a crank angle signal.

This arrangement removes the influences exerted by changes in the revolution speed of an engine or abrupt changes in the number of pulses, thus enabling higher reliability.

In the knock control system for the internal combustion engine according to a fifteenth aspect of the invention, the filtering means separately sets a filtered value for each cylinder.

This arrangement permits further improved reliability.

In the knock control system for the internal combustion engine according to a sixteenth aspect of the invention, the knock control means includes delay amount setting means for separately setting the amount of delay for each cylinder and delay difference limiting means for setting the upper limit of the difference in the amount of delay.

In the knock control system for the internal combustion engine according to a seventeenth aspect of the invention, the ignition timing calculating means advances the ignition timing by a predetermined amount when the knock signal waveform is not superposed on the ionic current detection signal and when the delay correction of the ignition timing is not carried out for a predetermined time.

This arrangement improves the output characteristics within a range where no knock takes place.

In the knock control system for the internal combustion engine according to an eighteenth aspect of the invention, the predetermined time is decreased as the revolution speed of the internal combustion engine increases.

With this arrangement, the output characteristics can be improved by high control responsiveness regardless of the revolution speed.

In the knock control system for the internal combustion engine according to a nineteenth aspect of the invention, the advancing amount is decreased as the revolution speed of the internal combustion engine increases.

With this arrangement, the trouble caused by the occurrence of knocks can be restrained regardless of the revolution speed.

In the knock control system for the internal combustion engine according to a twentieth aspect of the invention, the ignition timing calculating means advances the ignition timing by a predetermined amount if the knock signal waveform is not superposed on the ionic current detection signal and the correction of the ignition timing by delaying it is not carried out for a predetermined number of ignitions.

With this arrangement, the output characteristics can be improved within a range where no knock takes place.

DESCRIPTION OF THE PREFERRED EMBODIMENTS

[First Embodiment]

A first embodiment of the present invention will be described with reference to the accompanying drawings.

Figure 1:
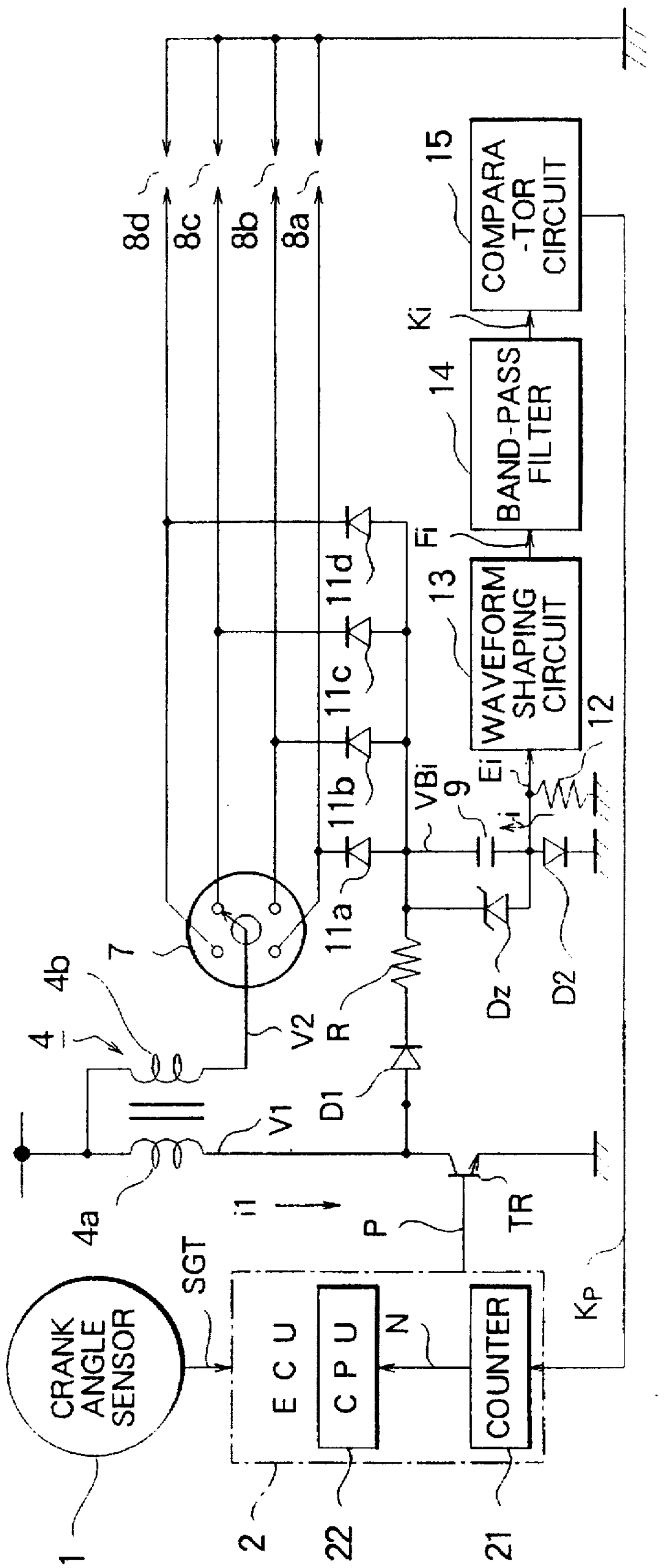
FIG. 1 is a block diagram schematically showing a first embodiment in accordance with the present invention.

FIG. 1 is a block diagram schematically showing the first embodiment in accordance with the present invention; it illustrates a case wherein high voltage is supplied to the spark plug of each cylinder via a distributor.

Figure 2:
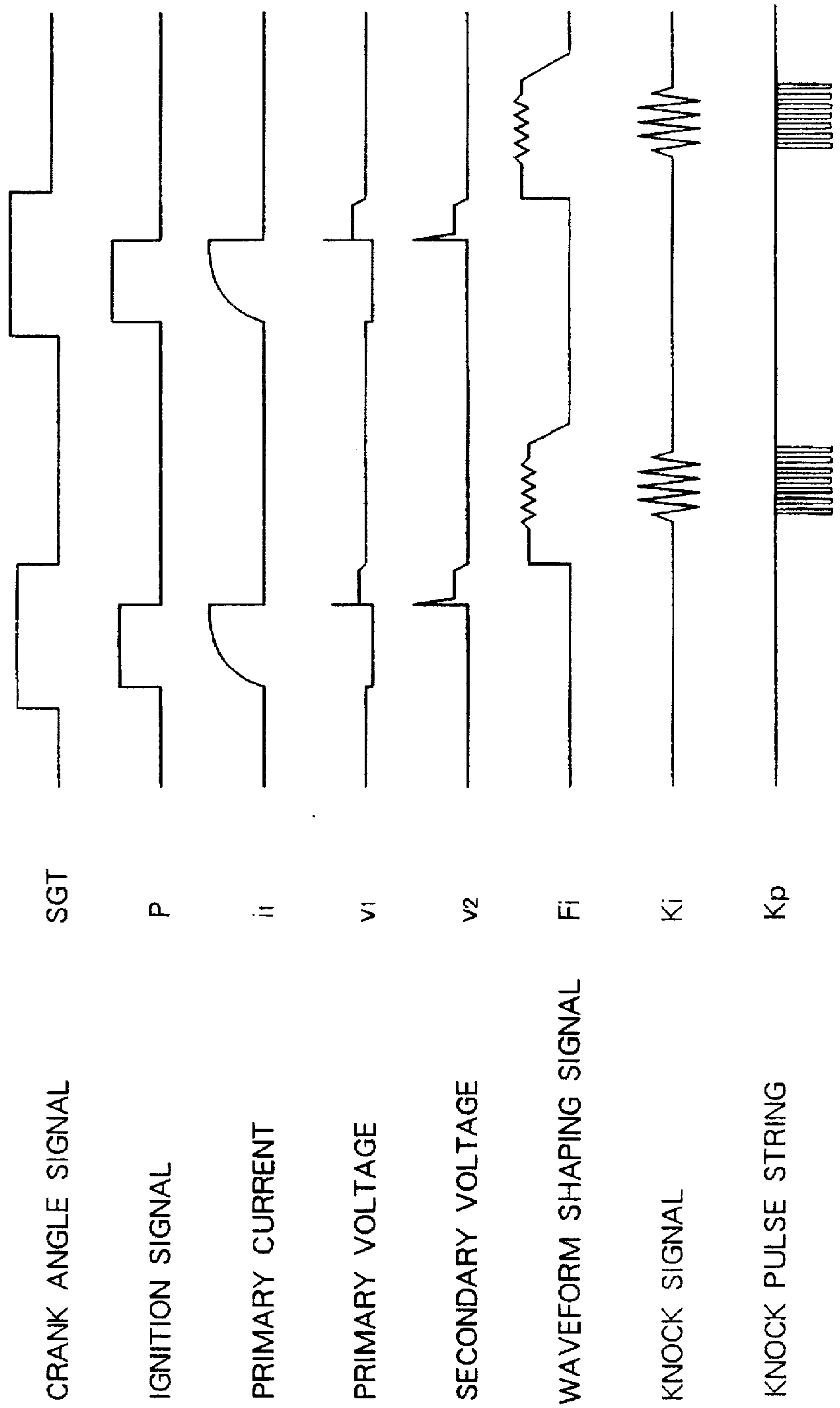
FIG. 2 is a timing chart showing the operation waveforms of the respective sections of the first embodiment in accordance with the present invention.

FIG. 2 is a timing chart illustrative of the operation waveforms of signals shown in FIG. 1; it shows a state wherein a knock signal waveform has been superposed on an ionic current i.

In FIG. 1, a crankshaft of an internal combustion engine, i.e. an engine, which is not shown, is provided with a crank angle sensor 1 which issues a crank angle signal SGT composed of pulses based on the revolution speed of the engine.

Each pulse edge of the crank angle signal SGT indicates the crank angle reference position of each cylinder, not shown, of the internal combustion engine. The crank angle signal SGT is supplied to an ECU 2 comprised of a microcomputer to perform various types of control arithmetic operations.

The ECU 2 includes a counter 21 which counts the pulse number N of a knock pulse string Kp received from a waveform processing means which will be discussed later, and a CPU 22 which determines whether a knock exists or not according to the pulse number N.

The counter 21 and the CPU 22 constitute a knock detection means in cooperation with the waveform processing means.

The ECU 2 captures the crank angle signal SGT from the crank angle sensor 1 and also the operation information from various sensors, not shown, then performs various types of arithmetic operations according to the operation state to send out driving signals to various actuators including an ignition coil 4.

A driving signal supplied to the ignition coil 4, namely, an ignition signal P, is applied to the base of a power transistor TR connected to a primary winding 4*a* of the ignition coil 4 to turn ON/OFF the power transistor TR, thereby cutting off the supply of a primary current i1. Cutting off the supply of the primary current i1 causes a primary voltage V1 to increase and a secondary winding 4*b* of the ignition coil 4 generates a further increased secondary voltage V2 as the high voltage (a few 10 kV) for ignition.

A distributor 7 connected to an output terminal of the secondary winding 4*b* distributes and applies the secondary voltage V2 to spark plugs 8*a* through 8*d* in sequence in synchronization with the revolution of the internal combustion engine, thereby generating a discharge spark in a combustion chamber of a cylinder under ignition control to burn a fuel-air mixture.

A series circuit composed of a rectifier diode D1 connected to one end of the primary winding 4*a*, a current limiting resistor R, a capacitor 9 connected in parallel to a voltage limiting Zener diode DZ, and a rectifier diode D2 is connected from one end of the primary winding 4*a* to the ground so as to constitute a path through which a charging current for the capacitor 9, which serves as a bias power supply for detecting ionic currents, flows.

The capacitor 9 connected in parallel to both ends of the Zener diode DZ is charged to a predetermined bias voltage VBi (a few 100 V) by the charging current from the primary voltage V1; it functions as the bias power supply for detecting the ionic current i and it discharges via a spark plug immediately after ignition control among the spark plugs 8*a* through 8*d* so as to let the ionic current i flow.

High-voltage diodes 11*a* through 11*d* with their anodes connected to one end of the capacitor 9 have their cathodes connected to the ends of one side of the respective spark plugs 8*a* through 8*d* so that they provide the same polarity as the ignition polarity.

A resistor 12 for detecting ionic currents which is connected to the other end of the capacitor 9 voltage-converts the ionic current i before issuing it as an ionic current detection signal Ei.

The resistor 12 is connected to the ends of the other side of the spark plugs 8*a* through 8*d* via the ground; it forms a path, through which the ionic current i flows, in cooperation with the capacitor 9 and the high-voltage diodes 11*a* through 11*d*.

The ionic current detection signal Ei issued from the resistor 12 turns into a waveform shaping signal Fi via a waveform shaping circuit 13; then, only a knock signal Ki is extracted through a band-pass filter 14 and it is converted to a knock pulse string Kp via a comparator circuit 15 before it is supplied to the counter 21 in the ECU 2.

The waveform shaping circuit 13, the band-pass filter 14, and the comparator circuit 15 constitute a waveform processing means for extracting the knock pulse string Kp from the ionic current detection signal Ei.

The pulse number N of the knock pulse string Kp is counted in the ECU 2; the pulse number N is used for determining whether there is a knock or not as previously described.

Figure 3:
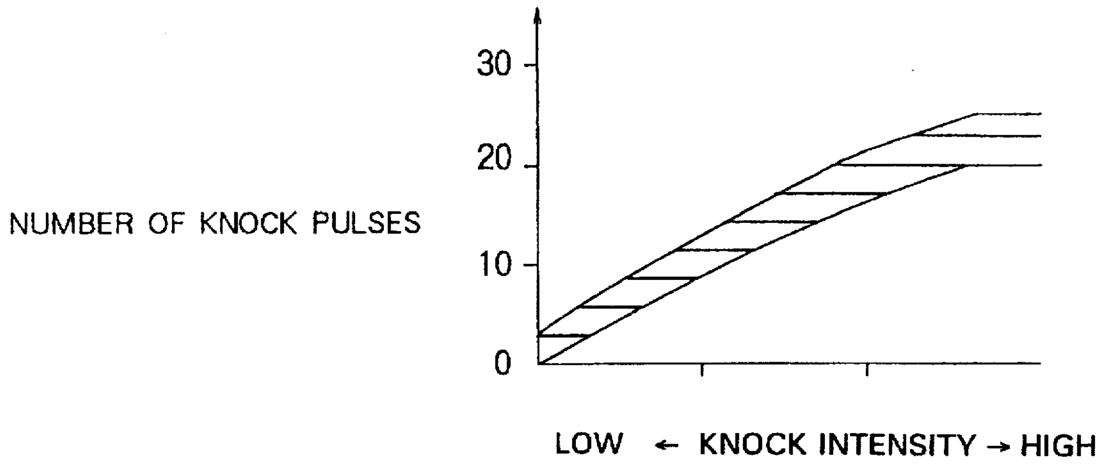
FIG. 3 is a characteristic diagram showing a relationship between the intensity of knock and the number of knock pulses.

The pulse number N of the knock pulse string Kp is closely connected to the intensity of a knock; as shown in the characteristic chart of FIG. 3, the pulse number N increases as the intensity of a knock increases.

In FIG. 3, the hatched area of the chart indicates the range of the possible pulse number N in relation to the different levels of knock intensity.

Referring now to FIG. 1 through FIG. 3, the operation of the first embodiment of the present invention will be described.

The ECU 2 first issues the ignition signal P for supplying and cutting off electric currents to the power transistor TR according primarily to the crank angle signal SGT received from the crank angle sensor 1. The power transistor TR supplies the primary current i1 while the ignition signal P stays at H level whereas it cuts off the supply of the primary current i1 when the ignition signal P switches to L-level.

At this time, the boosted primary voltage V1 appears in the primary winding 4*a*. This causes the capacitor 9 to be charged via a charging current path constituted by the rectifier diode D1, the resistor R, the capacitor 9, and the rectifier diode D2.

The charging of the capacitor 9 stops as soon as the charging voltage of the capacitor 9 reaches the same level as that of the reverse breakdown voltage, i.e. bias voltage VBi, of the Zener diode DZ.

When the primary voltage V1 is generated in the primary winding 4*a*, the secondary winding 4*b* generates the secondary voltage V2 of a few 10 kV which has been boosted to the high voltage for ignition; the secondary voltage V2 is applied to the spark plugs 8*a* through 8*d* of the respective cylinders via the distributor 7 so as to cause the spark plug of a cylinder placed under the ignition control to generate spark discharge, thereby burning the mixture.

When the mixture burns, ions are produced in the combustion chamber of the burning cylinder, causing the ionic current i to flow by the bias voltage VBi charged in the capacitor 9. For example, when the mixture is burnt by the ignition plug 8*a*, the ionic current i flows in a path constructed by the capacitor 9, the rectifier diode 11*a*, the ignition plug 8*a*, the resistor 12, and the capacitor 9 in the order in which they are listed.

The ionic current i turns into the ionic current detection signal Ei through the resistor 12 or into the waveform shaping signal Fi through the waveform shaping circuit 13.

As shown in FIG. 2, only the ionic current component of the waveform shaping signal Fi is clipped to a fixed voltage level so as to provide a signal waveform which permits easy extraction of the knock signal Ki.

For instance, when a knock places place in the internal combustion engine, the signal component of the knock vibrations is superposed on the ionic current i and therefore, the waveform shaping signal Fi exhibits a waveform in which the knock vibration component has been superposed on the ionic current waveform.

The waveform shaping signal Fi is supplied to the band-pass filter 14 and the comparator circuit 15 constituting the waveform processing means.

More specifically, the band-pass filter extracts only the knock signal Ki, which indicates the knock vibration frequency, from the waveform shaping signal Fi; and the comparator circuit 15 supplies the knock pulse string Kp, which has been obtained by comparing the knock signal Ki with a predetermined level of signal, to the counter 21 in the ECU 2.

In response to the rising edge or the falling edge of the knock pulse string Kp, the counter 21 in the ECU 2 counts the pulse number N of the knock pulse string Kp and supplies the count result to the CPU 22.

Since the pulse number N increases as the intensity of knock increases as shown in FIG. 3, the CPU 22 in the ECU 2 is able to determine the presence of a knock and the intensity of the knock by the pulse number N.

For instance, if the count value of the pulse number N exceeds a predetermined pulse number, then the CPU 22 determines that a knock has occurred and delays the ignition timing by a predetermined amount. After that, if the CPU 22 determines that a knock has occurred in succession, it adds up the amounts of delay in sequence; it stops adding up the amounts of delay when it determines that there is no more knock.

If it has been determined that both pulse number N and the intensity of knock are large, then the amount of delay for the ignition timing, i.e. the fall timing of an ignition signal Q, may be set to a large value from the beginning.

The predetermined pulse number, which provides the comparison standard for determining the occurrence of a knock, is set to about 5 to about 20 although it depends on the revolution speed of an engine and the waveform shaping level in the comparator circuit 15.

Thus, by determining the amount of delay for correcting the ignition timing based on the determination result given by the CPU 22, the ignition timing for the cylinder which has incurred a knock can be optimally corrected so as to effectively control the occurrence of knocks.

Moreover, sending the knock pulse string Kp to the ECU 2 makes it easy for the ECU 2 to capture the signals and it also restrains the superposition of noise in the signal transmission path, thus enabling improved SN ratio.

[Second Embodiment]

In the first embodiment described above, no particular period has been set for detecting the knock pulse string Kp; such a detection period of the knock pulse string Kp may be restricted only to the period immediately following the combustion and expansion stroke.

Referring now to the timing chart shown in FIG. 4, a second embodiment of the present invention will be described in which the counting period, i.e. the detection period of the knock pulse string Kp, is restricted.

The schematic configuration of the second embodiment of the invention is as shown in FIG. 1 except that the function of the ECU 2 is partially different. The operation waveforms of the respective sections are as illustrated in FIG. 2. The same will apply also to third through fifth embodiments and to seventh through eighteenth embodiments which will be discussed later.

As previously mentioned, since the ionic current i is a very small current, it is prone to be superposed by a noise signal. Furthermore, when a noise frequency is close to a knock frequency, the noise passes through the band-pass filter and it is undesirably supplied to the ECU 2 together with the knock pulse Kp.

In particular, when the supply of electric currents to the primary current i1 by the ignition signal P is started, the primary voltage V1 appears; and at the time of ignition by the cutoff of the primary current i1, the secondary voltage V2 of high voltage is generated in the secondary winding 4*b*. These voltages create a noise pulse np (see FIG. 4) which is superposed on the very weak ionic current. Hence, it is necessary to remove such noise at the time of ignition in order to determine the occurrence of a knock with high reliability.

In this embodiment, therefore, the period for the comparator circuit 15 to produce the knock pulse Kp or the period for the ECU 2 to detect the knock pulse Kp is limited to a period from a moment immediately following the combustion and expansion stroke of an internal combustion engine to a moment immediately preceding the start of the next supply of electric currents, i.e. the rise of the ignition signal P, in order to reduce the chance of erroneous detection of a knock caused by the noise pulse np.

To be more specific, the detection period of the knock pulse Kp is set to a pulse section of the L-level of the crank angle signal SGT, namely, from falling edge B75 degrees to rising edge B5 degrees, thereby reducing the chance of erroneous knock determination attributable to the superposition of the noise pulse np.

The detection period is restricted as described above because the rising edge of the crank angle signal SGT (see FIG. 2) usually corresponds to the timing at which the supply of electric currents is begun (approximately B75 degrees) in the initial phase, i.e. at the time of cranking the internal combustion engine, and the falling edge thereof corresponds to the initial ignition timing (approximately B5 degrees). Furthermore, the electric current supply start timing is set to a point which is slightly delayed from the rising edge of the crank angle signal SGT whereas the ignition timing, i.e. the fall timing of the ignition signal P, is set to a point which is slightly advanced from the falling edge of the crank angle signal SGT.

Thus, in the L-level period after the fall of the crank angle signal SGT, the noise at the time of ignition are removed, ensuring reliable detection of the ionic current detection signal Ei and the knock signal Ki.

As a result, the counter 21 counts the pulse number N of the knock pulse string Kp with high accuracy in the L-level period of the crank angle signal SGT which immediately follows the combustion and expansion stroke, enabling the CPU 22 to determine the occurrence of a knock with high accuracy according to the highly accurate pulse number N.

[Third Embodiment]

In the first embodiment, the revolution speed of the internal combustion engine has not been taken into consideration. Considering, however, that the pulse number N of the knock pulse string Kp decreases as the revolution speed of the engine increases, the count value of the pulse number N may be corrected according to the revolution speed of the engine so as to further improve the reliability of the detection of a knock.

The third embodiment of the present invention will be described wherein the count value of the pulse number N is corrected according to the revolution speed of the engine.

In this embodiment, the CPU 22 in the ECU 2 includes a count value correcting means for correcting the count value of the pulse number N by increasing it as the revolution speed of the engine increases, and the knock control means in the ECU 2 determines the amount of delay for the ignition timing based on a corrected count value.

Normally, the pulse number N of the knock pulse string Kp (see FIG. 2) varies according to the revolution speed of the engine as well as the intensity of a knock; the pulse number N tends to be smaller at a higher the revolution speed.

Therefore, the relationship between the pulse number N and the delaying amount of the ignition timing must be corrected according to the revolution speed of the engine.

The pulse number N of the knock pulse string Kp counted by the counter 21 is, therefore, corrected by increasing it according to an increase in the revolution speed of the engine and the amount of delay is set based on a pulse number Nc which has been corrected based on the revolution speed.

Thus, correcting the delay of the ignition timing permits optimum knock restraining control over the entire revolution speed range of the internal combustion engine.

[Fourth Embodiment]

In the third embodiment described above, the count value of the pulse number N has been corrected in order to correct the relationship of the pulse number N to the amount of delay of the ignition timing based on the revolution speed of the engine; however, the amount of delay may be corrected in place of the count value of the pulse number N.

The fourth embodiment of the invention will be described in which the amount of delay is increased as the revolution speed of the engine increases.

In this embodiment, the knock control means in the ECU 2 includes a delay amount correcting means for increasing the amount of delay of the ignition timing as the revolution speed of the engine increases.

The delay amount correcting means corrects the amount of delay of the ignition timing, which has been mapped according to the pulse number N, based on the revolution speed so as to carry out the ignition timing control using the corrected amount of delay.

Thus, as in the embodiment described above, optimum knock restraining control can be achieved over the full range of the revolution speed of the internal combustion engine.

[Fifth Embodiment]

In the fourth embodiment described above, the amount of delay of the ignition timing has been corrected only based on the revolution speed of the engine; however, the amount of delay may alternatively be corrected using a two-dimensional map of the revolution speed of the engine and charging efficiency which corresponds to engine load.

The fifth embodiment of the invention will now be described in which the amount of delay is corrected based on the two-dimensional map of the revolution speed of the engine and the charging efficiency.

In this embodiment, the knock control means includes a delay amount correcting means for correcting the amount of delay of the ignition timing according to the two-dimensional map of the revolution speed of the engine and the charging efficiency.

The pulse number N of the knock pulse string Kp varies according to the charging efficiency, which corresponds to engine load, as well as the intensity of a knock and the revolution speed of the engine; therefore, the amount of delay of the ignition timing in relation to the pulse number N needs to be corrected according to the revolution speed of the engine and the charging efficiency.

Hence, the pulse number N of the knock pulse string Kp is corrected by the delay amount correcting means in the knock control means based on the two-dimensional map of the revolution speed of the engine and the charging efficiency, thereby controlling the delay of the ignition timing.

Thus, optimum knock restraining control can be achieved over the full range of the revolution speed and the full load range of the internal combustion engine.

In the third through fifth embodiments described above, the count value of the pulse number N or the amount of delay has been corrected based on the revolution speed of the engine or the charging efficiency. It is obvious, however, that the equivalent advantages can be obtained by correcting at least the count value of the pulse number N or the amount of delay according to an arbitrary operation state that influences the pulse number N, the amount of delay, etc.

[Sixth Embodiment]

In the first through fifth embodiments described above, the present invention has been applied to the internal combustion engine wherein the high voltage is distributed to the spark plugs 8*a* through 8*d* via the distributor 7; however, the present invention may also be applied to an internal combustion engine wherein low voltage is distributed simultaneously to a pair of the spark plugs 8*a* and 8*c* or a pair of the spark plugs 8*b* and 8*d*, which is known as the group ignition.

The sixth embodiment of the present invention will now be described wherein a pair of cylinders is ignited at a time.

Figure 5:
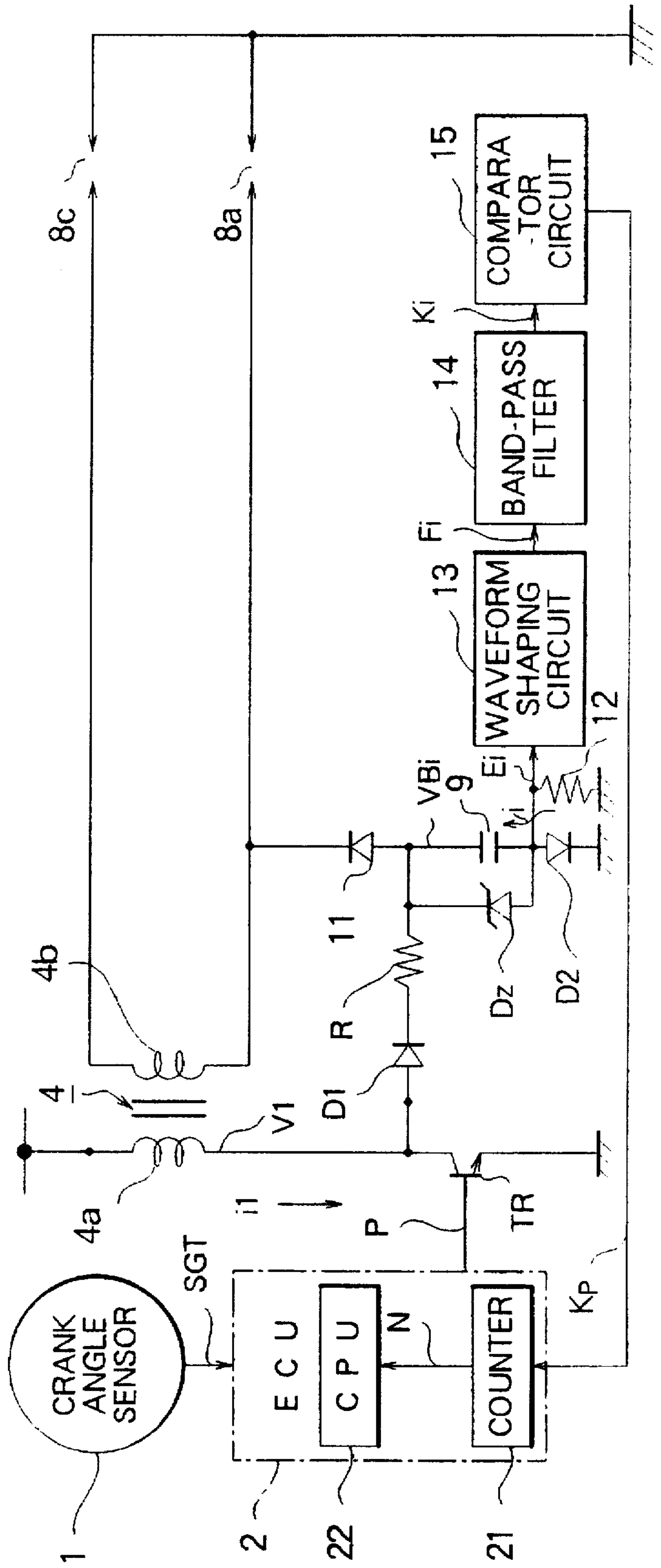
FIG. 5 is a block diagram schematically showing a sixth embodiment in accordance with the present invention.

FIG. 5 is a block diagram schematically showing the sixth embodiment of the invention. The similar components as those mentioned above will be assigned identical reference numerals and the explanation thereof will be omitted.

Figure 6:
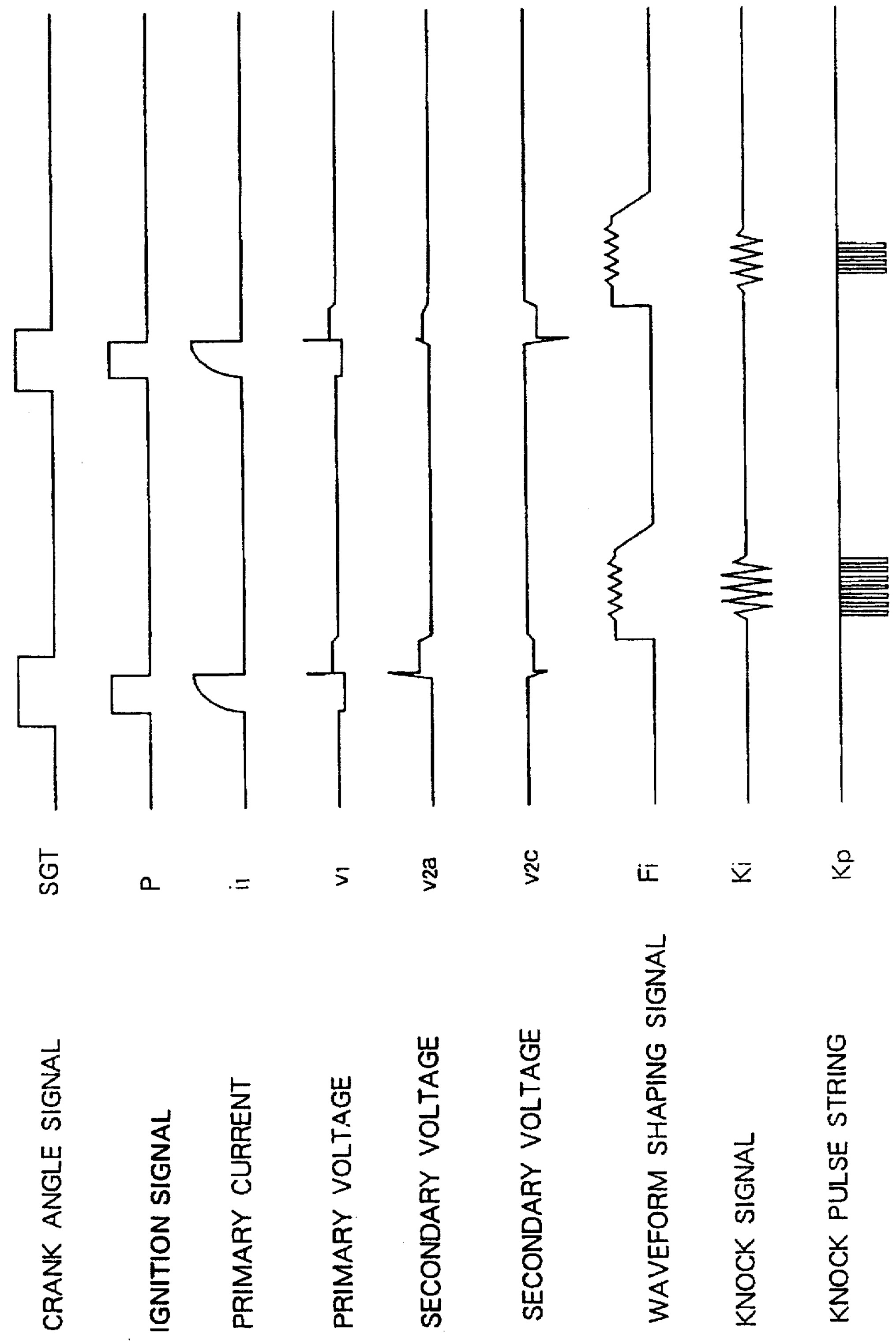
FIG. 6 is a timing chart showing the operation waveforms of the respective sections of the sixth embodiment in accordance with the present invention.

FIG. 6 is a timing chart illustrative of the operations waveforms of the respective signals shown in FIG. 5; it shows a knock signal waveform superposed on the ionic current i.

An ignition circuit comprised of the power transistor TR and the ignition coil 4 and the ionic current detecting circuit comprised of the capacitor 9, the high-voltage diode 11, the resistor 12, and the circuits 13 through 15, which are similar to those shown in FIG. 5 are provided for the other pair of the spark plugs **8*b* and 8*d* (see FIG. 1) as well although they are not shown. The knock pulse string Kp based on the ionic current i is supplied to the ECU 2**.

In this embodiment, the pair of spark plugs **8*a* and 8*c* of the cylinders are connected to both ends of the secondary winding 4*b* of the ignition coil 4** which generates the high voltage V2 for ignition; they are ignition-controlled at the same time.

The ionic current i of the spark plugs **8*a* and 8*c* is detected via the common high-voltage diode 11**.

At the time of the ignition control, the spark plug of a burning cylinder in the compression stroke discharges when the high secondary voltage is applied thereto because of the presence of the compressed air-fuel mixture; whereas, the spark plug of the other cylinder in the exhaust stroke discharges at the low secondary voltage because of the absence of the compressed air-fuel mixture.

In FIG. 6 illustrates the following: first, a high secondary voltage V**2*a* is applied to the spark plug 8*a* and the high level of the knock signal Ki is extracted from the ionic current i of the activated spark plug 8*a*, then a high secondary voltage V2*c* is applied to the spark plug 8*c* and the low level of the knock signal Ki is extracted from the ionic current i of the actuated spark plug 8*c***.

At the time of detecting the ionic current i, the ionic current i of the spark plug **8*c* of one of the paired cylinders flows from the high-voltage diode 11 via the secondary winding 4*b*; the ionic current i of the other spark plug 8*a* flows directly from the high-voltage diode 11 and it is divided into a path which includes the secondary winding 4*b* and a path which does not include the secondary winding 4*b***.

More specifically, when the ignition coil 4 for the simultaneous ignition is used, the ionic current i flows through the capacitor 9, the high-voltage diode 11, the spark plug **8*a*, the resistor 12, and the capacitor 9 in the order in which they are listed; whereas, when the air-fuel mixture is burnt by the spark plug 8*c*, the ionic current i flows through the capacitor 9, the high-voltage diode 11, the secondary winding 4*b*, the spark plug 8*c*, the resistor 12, and the capacitor 9** in the order in which they are listed.

Hence, the amplitude of the signal waveform attributable to knock vibration which is superposed on the ionic current i decreases by the inductance of the secondary winding **4*b* when the ionic current i passes through the secondary winding 4*b***.

The decreased amplitude of the ionic current i leads to a smaller amplitude of the knock signal Ki obtained by waveform-processing the ionic current detection signal Ei and to a smaller pulse number N of the knock pulse string Kp which is subjected to further processing before it is finally output.

For this reason, when applying the knock restraining control based on the ionic current i to a system adapted for the simultaneous ignition, the delay control amount for the ignition timing based on the pulse number N must be corrected according to the path that the ionic current i takes.

More specifically, when the ionic current i of the spark plug **8*c* which is employed for knock detection takes the path which includes the secondary winding 4*b***, the amount of delay of the ignition timing is increased according to the pulse number N of the knock pulse string Kp.

This permits optimum knock restraining control based on accurate knock information even when the invention is applied to the simultaneous ignition type internal combustion engine.

[Seventh Embodiment]

In the first through sixth embodiments described above, no measures has been considered against a case wherein a noise, which is able to pass through the band-pass filter 14 because of its frequency which is close to the knock vibration, has been superposed on the ionic current i. To prevent a knock control mistake caused by such a noise imposed on the ionic current i, the pulse number N which has been counted may be filtered to restrain the influences exerted by the noise.

Figure 4:
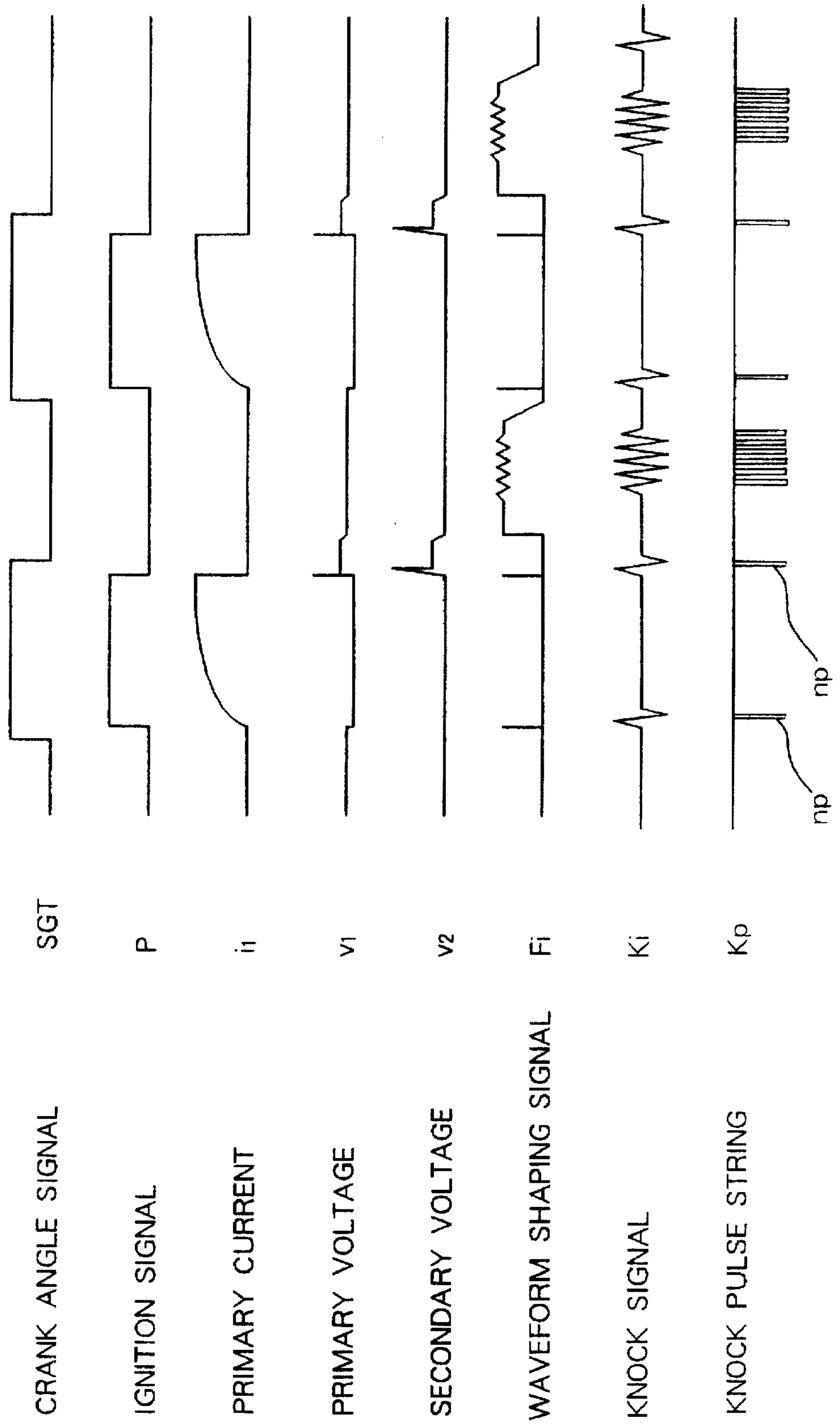
FIG. 4 is a timing chart illustrating the operation of a second embodiment of the present invention.

In this case, in the second embodiment, for example, the ignition timing is controlled to be later than the falling edge of the crank angle signal SGT, so that even if the noise pulse np shown in FIG. 4 is superposed in the counting period of the knock pulse string Kp, the noise pulse np can be securely removed.

The following will describe the seventh embodiment of the present invention wherein the count value of the pulse number N is filtered.

Normally, the counter 21 in the ECU 2 counts the pulse number N without distinguishing the noise pulses superposed on the knock pulse string Kp; therefore, it is necessary to deduct the number of noise pulses from the counted pulse number N.

Hence, the knock control means in the ECU 2 includes a filtering means for filtering the count value of the pulse number N to obtain a filter value Nf which corresponds to the number of noise, i.e. a background component; it determines the amount of delay according to the count value Nc for controlling the delay which has been obtained by deducting the present filter value Nf from the present count value.

First, the filtering means in the knock control means carries out the filtering operation indicated by an expression (1) given below on the a pulse number Ni which has been counted this time so as to determine a present filter value Nfi.

$$Nfi=Nfi-1\times\alpha+Ni-1\times(1-\alpha) \quad (1)$$

where Nfi-1 denotes a previous filter value; Ni-1 is a previous number of pulses; and α is a filtering coefficient used for the filtering operation ($0<\alpha<1$). The value of α, for example, is set within a range defined by $0.7\leqq\alpha<1$.

The filter value Nfi obtained from the expression (1) corresponds to the background component of the counter value which includes the noise and the like.

Hence, the knock control means uses the pulse number Ni which has been counted this time and the present filter value Nfi which has been calculated using the expression (1) so as to obtain the pulse number Nci for the present delay control according to an expression (2) given below:

$$Nci=Ni-Nfi \quad (2)$$

The pulse number Nci obtained from the expression (2) denotes a value from which the background component has been eliminated from; it indicates, therefore, the fluctuation in the pulse number N, that is, only the fluctuation in the knock vibration.

After that, the knock control means determines the amount of delay of the ignition timing by mapping operation using the pulse number Nci which corresponds to the knock vibration component and it generates the final ignition signal P.

Thus, by filtering the count value of the pulse number N, the noise pulses superposed on the knock pulse string Kp can be removed, thereby making it possible to obtain the pulse number Nc which is close to the value of only the knock vibration component. This enables optimum knock control.

[Eighth Embodiment]

In the seventh embodiment described above, no upper limit value has been set for the filter value Nf; however, such an upper limit value may be set for clipping purpose so that an abnormal value may be known.

The eighth embodiment of the invention will now be described wherein an upper limit value is set for the filter value.

For example, with no upper limit value set for the filter value Nf, if many knock pulse strings Kp are suddenly generated in successive cylinders, then the count value of the pulse number N suddenly increases. This causes the filter value Nf to become abnormally large, while it causes the pulse number Nc for delay control to become excessively small. As a result, the amount of delay is restrained whereas there are pulses generated from knock vibration.

To solve such a problem, the filtering means in the knock control means sets an upper limit value of the filter value Nf, so that, if the filter value obtained by the expression (1) exceeds the upper limit value, then the filter value Nf is clipped using the upper limit value.

This prevents the pulse number Nc for controlling the delay calculated using the expression (2) from becoming excessively small and enables an appropriate amount of delay of ignition timing to be set according to the pulse number Nc, thus maintaining optimum knock restraining control.

[Ninth Embodiment]

In the eighth embodiment described above, the upper limit value of the filter value Nf is fixed; however, the upper limit value may be a mapped value based on the revolution speed of the engine, considering that the count value of the pulse number N based on superposed knock vibration which includes noise varies with the revolution speed of the internal combustion engine.

The ninth embodiment will now be described in which the upper limit value of the filter value is updated by a mapped value based on the revolution speed of the engine.

In general, the number of noise pulses, which corresponds to a filter value and which is superposed on the knock pulse string Kp tends to increase as the revolution speed of the engine increases. For this reason, the upper limit value of the filter value Nf must also be increased as the revolution speed of the engine increases.

The filtering means provides the upper limit value of the filter value Nf with a revolution speed characteristic and increases the filter value Nf as the revolution speed of the engine increases by mapping operation or the like.

In the ninth embodiment described above, the upper limit value of the filter value Nf is updated according to the revolution speed of the engine. It is obvious, however, the similar advantage would be obtained also by updating the upper limit value based on an arbitrary operation state including the charging efficiency that influences the filter value Nf.

[Tenth Embodiment]

In the ninth embodiment discussed above, the upper limit value of the filter value Nf is corrected according to the revolution speed of the engine, i.e. the operation state. As an alternative, the filter coefficient $\alpha$ may be corrected according to the revolution speed of the engine, i.e. the operation state.

The following will describe the tenth embodiment of the invention wherein the filter coefficient $\alpha$ is corrected according to the revolution speed of the engine, taking the example where the operation state is indicated by the revolution speed of the engine as in the previous case.

In this embodiment, the filtering means includes a filter coefficient correcting means to turn the filter coefficient $\alpha$ into a mapped value based on the revolution speed of the engine and to increase the filter coefficient $\alpha$ as the revolution speed of the engine increases.

Thus, in a high-the revolution speed range where there are many unstable factors, the present filter value Nfi obtained from the expression (1) approaches the previous filter value Nfi-1 and becomes more resistant to the present pulse number Ni, thus making it possible to maintain a relatively stable knock restraining control state.

[Eleventh Embodiment]

In the seventh embodiment, the timing for the filtering calculation has not been considered; however, the filter value Nf may be calculated at a timing which responds to a pulse edge of the crank angle signal SGT.

The eleventh embodiment will now be described in which the filtering of the pulse number N is performed in synchronization of the crank angle signal SGT.

In this embodiment, the filtering means calculates the filter value Nf according to the expression (1) at every pulse edge, e.g. every rising edge, of the crank angle signal SGT.

Thus, the filtering is frequently implemented as the revolution speed of the engine increases and therefore, highly reliable filter value Nf which takes the revolution speed of the engine into account can be obtained as compared with the case wherein the filtering is carried out at predetermined intervals.

[Twelfth Embodiment]

In the seventh embodiment described above, the count value of the pulse number N has been filtered without considering the differences in the knock vibration among the cylinders; however, the filtering may be carried out separately for each cylinder.

The twelfth embodiment will now be described wherein the filtering is implemented separately for each cylinder.

Typically, the noise superposed on the ionic current i vary from one cylinder to another of an internal combustion engine. Hence, if there are significant differences in the amount of superposed noise among the cylinders, then an appropriate filter value Nf cannot be calculated unless the filtering is carried out separately for each cylinder.

In this embodiment, therefore, the filtering means separately implements the filtering operation according to the expression (1) separately for each cylinder and individually stores the filter value Nf for each cylinder.

Hence, the knock control means sets an appropriate amount of delay of the ignition timing for each cylinder so as to permit optimum knock restraining control.

[Thirteenth Embodiment]

In the first embodiment previously described, no limitation has been established for the amount of delay for each cylinder; however, if there are abnormally large differences in the amount of delay, then an upper limit may be set for the differences in the amount of delay in order to prevent excessive delay control over the respective cylinders to be controlled.

The following will describe the thirteenth embodiment of the invention wherein an upper limit is established for the differences in the amount of delay among the respective cylinders.

In this embodiment, the knock control means includes a calculating means for individually calculating the amount of delay for each cylinder according to the count value of the pulse number N detected for each cylinder and a delay difference limiting means for setting an upper limit of the differences in the amount of delay.

Thus, if the amount of delay for a particular cylinder is abnormally larger than the amounts of delay for the remaining cylinders, then the amount of delay for that particular cylinder can be limited.

For example, if there are many noise superposed on the ionic current i, the amount of delay for a cylinder on the most advanced side and that for a cylinder on the latest side are restricted.

Normally, when the ignition timing is controlled by delaying it to a crank angle point at ATDC 15 to 20 degrees, i.e. 15 to 20 degrees later than a top dead center, the amount of delay must be limited lest it should adversely affect the driving performance of the engine.

According to the thirteenth embodiment of the present invention, abnormal delay control caused by noise can be prevented by setting an upper limit for the amount of delay of a particular cylinder.

[Fourteenth Embodiment]

The first embodiment has not referred particularly to the control to be conducted if no knock is detected. When no knock has been detected, the ignition timing may be advanced as much as possible to give priority to the control for maximum output (MBT control).

The fourteenth embodiment of the invention will now be described wherein the ignition timing is advanced when no knock has been detected.

The knock controlling system usually delays the ignition timing according to the level of a knock which has occurred. The MBT control is conducted at the ignition timing immediately before a knock starts; therefore, if no knock is present, then the ignition timing needs to be advanced.

Optimum knock control may be achieved by carrying out well balanced control by delaying and advancing the ignition timing.

The knock control system for the internal combustion engine based on the present invention employs the ionic current detection signal Ei; therefore, it is capable of securely detecting a small level of knock to allow the detected knock level to be securely reflected on the ignition signal P to be generated for delaying the ignition timing.

In other words, the ignition timing may be delayed according to a small knock, thus permitting considerable fluctuations in ignition timing to be restrained.

Considering the control by advancing in which the aforesaid advantages are effectively utilized, it may be seen that advancing the ignition timing by a predetermined advance angle for correction is useful when no knock occurs and no delay control is implemented on the ignition timing for a predetermined period of time.

Hence, the ignition timing calculating means in the ECU 2 advances the ignition timing by a predetermined amount if no knock signal waveform is superposed on the ionic current detection signal Ei and the correction by delaying the ignition timing due to the occurrence of a knock is not made for the predetermined period of time. In this case, the predetermined period of time is set as the period of time for checking that no knock is detected.

Thus, whether a knock occurs or not is checked for the predetermined period of time and if no knock is detected for that period of time, then the ignition timing is advanced gradually to obviate marked fluctuations in the ignition timing; the ignition timing is delayed when a knock of low intensity is detected.

With this arrangement, the ignition timing may be controlled to provide maximum output in a range where no knock occurs. Moreover, the fluctuations in the ignition timing are controlled as described above, enabling stable output torque to be obtained.

[Fifteenth Embodiment]

In the fourteenth embodiment described above, the predetermined period of time for checking that no knock is detected has been fixed. Alternatively, however, the predetermined period of time may be changed according to the revolution speed of the engine.

The fifteenth embodiment of the present invention will now be described wherein the predetermined period of time is updated according to the revolution speed of the engine.

In this embodiment, the predetermined period of time for checking that no knock is detected is updated, for example, as a mapped value with respect to the revolution speed of the engine and it is reduced as the revolution speed of the engine increases.

Thus, when no knock is detected at high revolution speed, the ignition timing is quickly advanced to prevent the delay in the advance control.

[Sixteenth Embodiment]

In the fifteenth embodiment described above, the predetermined period of time for checking that no knock is detected is updated according to the revolution speed of the engine. Alternately, however, the advancing amount may be updated.

In general, the intensity of knock is closely related to the revolution speed of the engine. At high the revolution speed, the knock needs to be restrained as much as possible; therefore, the advancing amount for the ignition timing should be provided with the revolution speed characteristic to assure optimum knock control.

The following will describe the sixteenth embodiment according to the present invention wherein the advancing amount is updated according to the revolution speed of the engine.

In this embodiment, the advancing amount to be applied when no knock is detected for a predetermined period of time is updated, for example, as a mapped value or a calculated function value related to the engine revolution speed; the value is decreased as the revolution speed of the engine increases.

Thus, if no knock is detected at high the revolution speed for the predetermined time of period, then the ignition timing is further advanced by a very small angle at a time. This makes it possible to restrain adverse influences caused by the occurrence of a knock even at high revolution speed at which adverse influences by a knock is particularly noticeable.

[Seventeenth Embodiment]

In the fourteenth embodiment described above, the predetermined period of time has been set for checking that no knock is detected. As an alternative, a predetermined number of ignitions may be set instead of the predetermined period of time.

The seventeenth embodiment according to the present invention will now be described wherein a predetermined number of ignitions is set in place of the predetermined period of time to check that no knock is detected.

Figure 7:
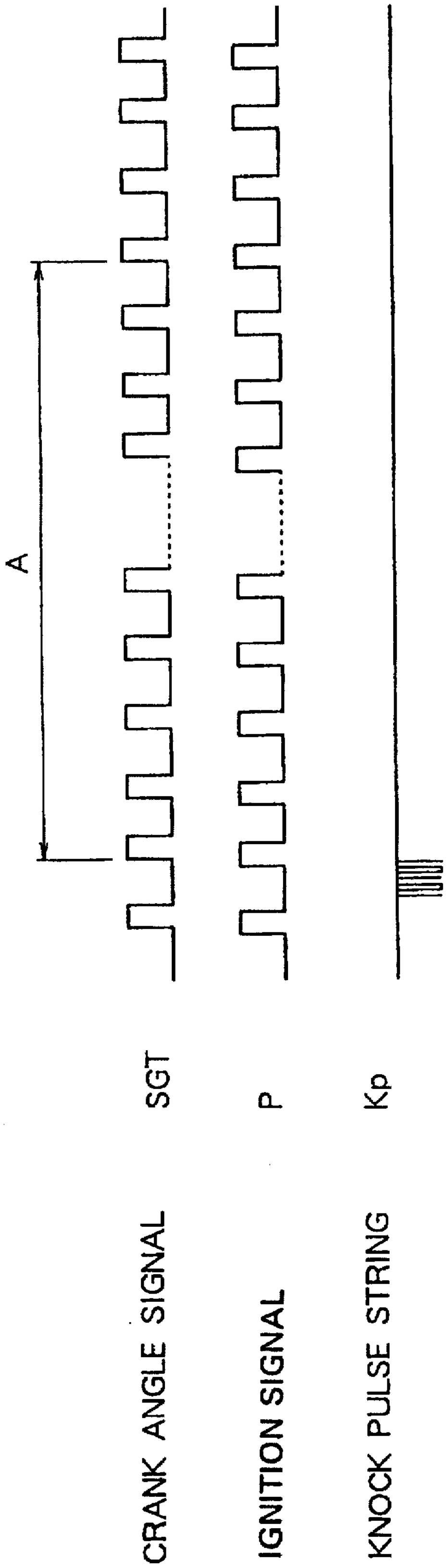
FIG. 7 is a timing chart illustrating the operation of a seventeenth embodiment in accordance with the present invention.

FIG. 7 shows a timing chart illustrative of the operation of checking that no knock is detected according to the seventeenth embodiment.

In FIG. 7, the number of ignitions, i.e. the pulse number of the ignition signal P, corresponds to the pulse number of the crank angle signal SGT, i.e. the number of rising edges of the crank angle signal SGT.

In this embodiment, the ECU 2 executes the processing for advancing the ignition timing when the period of time, during which no knock pulse string Kp occurs, lasts until the number of the rising edges of the crank angle signal SGT, i.e.

the number of ignition controls, reaches a predetermined number of ignitions A.

In other words, the ignition timing calculating means in the ECU 2 advances the ignition timing by a predetermined amount when no knock signal waveform is superposed on the ionic current detection signal Ei and the correction by delaying the ignition timing, which is to be made when knock occurs, is not made until the predetermined number of ignitions A is reached.

With this arrangement, the ignition timing may be controlled to provide maximum output within a range where no knock takes place.

At high the revolution speed, the period of time for checking for the control by delaying the ignition timing, which is to be conducted if a knock occurs, is automatically shortened; therefore, it is no longer necessary to update the period of time for checking that no knock is detected according to the revolution speed of the engine.

[Eighteenth Embodiment]

In the seventeenth embodiment described above, the advancing amount to be applied when no knock has been detected has been fixed; however, it may be updated according to the revolution speed of the engine.

The following will describe the eighteenth embodiment wherein the advancing amount is updated according to the revolution speed of the engine.

In this case, the advancing amount, which is to be applied when no knock is detected until a predetermined number of ignitions is reached, is updated, for example, as a mapped value or a calculated function value with respect to the revolution speed of the engine and it is reduced as the revolution of the engine increases.

Thus, if no knock is detected at high the revolution speed for the predetermined number of ignitions, then the ignition timing is further advanced by a very small angle at a time. This makes it possible to restrain adverse influences caused by the occurrence of a knock.

What is claimed is:

1. A knock control system for an internal combustion engine, comprising:

a crank angle sensor for generating a crank angle signal in synchronization with the revolution of the internal combustion engine;

ignition timing calculating means for determining the ignition timing for each cylinder of the internal combustion engine based on the crank angle signal;

an ignition coil for applying a high ignition voltage to a spark plug of a cylinder to be controlled in response to the ignition timing;

ionic current detecting means for detecting an ionic current flowing through a spark plug of each cylinder immediately following ignition control to generate an ionic current detection signal;

knock detecting means for determining the presence of a knock in the internal combustion engine based on the ionic current detection signal;

knock control means for delaying the ignition timing by a predetermined amount when a knock has been detected;

wherein the knock detecting means comprises:

waveform processing means for extracting a knock signal waveform in the form of a knock pulse string from the ionic current detection signal; and counting means for counting the number of pulses contained in the knock pulse string based on respective pulse edges in the knock pulse string;

whereby the knock control means determines the delay amount based on a count value of the pulses.

2. A knock control system for an internal combustion engine according to claim 1, wherein:

the crank angle signal includes a series of pulses each corresponding to an individual cylinder, each pulse having a rising edge corresponding to the timing at which the supply of electric currents to the ignition coil starts during engine cranking and a falling edge corresponding to an initial ignition timing during engine cranking; and the counting means counts the number of pulses during a pulse period from the falling edge to the following rising edge of the crank angle signal.

3. A knock control system for an internal combustion engine according to claim 1, wherein the knock control means comprises correcting means for correcting at least either a count value of the pulses or the delay amount based on an operation state of the internal combustion engine.

4. A knock control system for an internal combustion engine according to claim 3, wherein:

the correcting means increases the count value of the pulses as the revolution speed of the internal combustion engine increases; and the knock control means determines the amount of delay based on the corrected count value.

5. A knock control system for an internal combustion engine according to claim 3, wherein the correcting means increases the amount of delay as the revolution speed of the internal combustion engine increases.

6. A knock control system for an internal combustion engine according to claim 3, wherein the correcting means corrects the amount of delay based on a two-dimensional map of the revolution speed and charging efficiency of the internal combustion engine.

7. A knock control system for an internal combustion engine according to claim 1, wherein:

one pair of the spark plugs are connected to opposite ends respectively of a secondary winding of the ignition coil, which generates the high ignition voltage for simultaneous ignition;

an ionic current of one of the paired spark plugs flows via the secondary winding; and the knock control means increases the amount of delay of the ignition timing for one of the paired spark plugs.

8. A knock control system for an internal combustion engine according to claim 1, wherein the knock control means comprises filtering means for filtering a count value of the counting means to calculate a filtered value which corresponds to a background and for determining the amount of delay based on a value obtained by subtracting the filtered value from the present count value.

9. A knock control system for an internal combustion engine according to claim 8, wherein the knock control means comprises filtered value limiting means for setting an upper limit value of the filtered value.

10. A knock control system for an internal combustion engine according to claim 9, wherein the filtered value limiting means comprises upper value correcting means for correcting the upper limit value based on the operation state of the internal combustion engine.

11. A knock control system for an internal combustion engine according to claim 10, wherein the upper limit correcting means turns an upper limit value of the filtered value to a mapped value based on the revolution speed of the internal combustion engine and increases the upper limit limit value as the engine revolution speed increases.

12. A knock control system for an internal combustion engine according to claim 8, wherein the filtering means comprises:

calculating means for setting a filter coefficient $\alpha$ for calculating the filtered value in a range of $0<\alpha<1$ and adding a value, which is obtained by multiplying a previous filtered value by the filter coefficient $\alpha$, and a value, which is obtained by multiplying the present count value of pulses by $(1-\alpha)$, so as to provide the present filtered value; and filter coefficient correcting means for correcting the filter coefficient a based on the operation state of an internal combustion engine.

13. A knock control system for an internal combustion engine according to claim 12, wherein the filter coefficient correcting means turns the filter coefficient $\alpha$ into a mapped value based on the revolution speed of the internal combustion engine and it increases the filter coefficient as the revolution speed increases.

14. A knock control system for an internal combustion engine according to claim 8, wherein the filtering means calculates the filtered value at a timing based on a pulse edge of the crank angle signal.

15. A knock control system for an internal combustion engine according to claim 8, wherein the filtering means separately sets the filtered value for each cylinder.

16. A knock control system for an internal combustion engine according to claim 1, wherein the knock control means comprises:

delay amount setting means for separately setting the amount of delay for each cylinder; and delay difference limiting means for setting an upper limit for a difference between the amounts of delay.

17. A knock control system for an internal combustion engine according to claim 1, wherein the ignition timing calculating means advances the ignition timing by a predetermined amount when the knock signal waveform is not superposed on the ionic current detection signal and when the delay correction of the ignition timing is not carried out for a predetermined time.

18. A knock control system for an internal combustion engine according to claim 17, wherein the predetermined time decreases as the revolution speed of the internal combustion engine increases.

19. A knock control system for an internal combustion engine according to claim 17, wherein the amount of advance decreases as the revolution speed of the internal combustion engine increases.

20. A knock control system for an internal combustion engine according to claim 1, wherein the ignition timing calculating means advances the ignition timing by a predetermined amount when the knock signal waveform is not superposed on the ionic current detection signal and when the delay correction of the ignition timing is not carried out for a predetermined number of ignitions.

* * * * *